Dec. 10, 1957 E. C. NELSON 2,816,223
BINARY-CODED, FLIP-FLOP COUNTERS
Filed Dec. 23, 1952
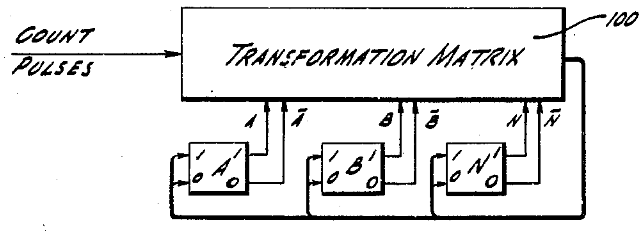
FIG. 1.
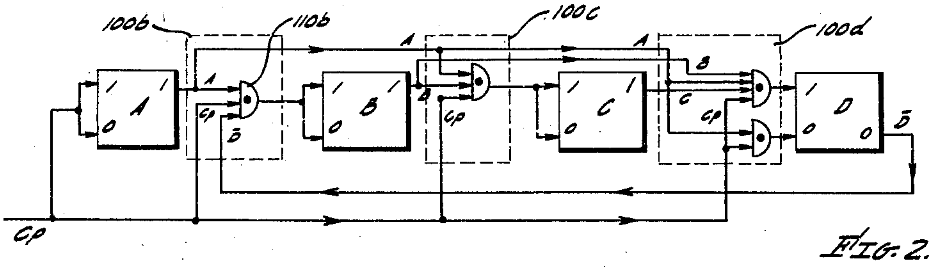
FIG. 2.
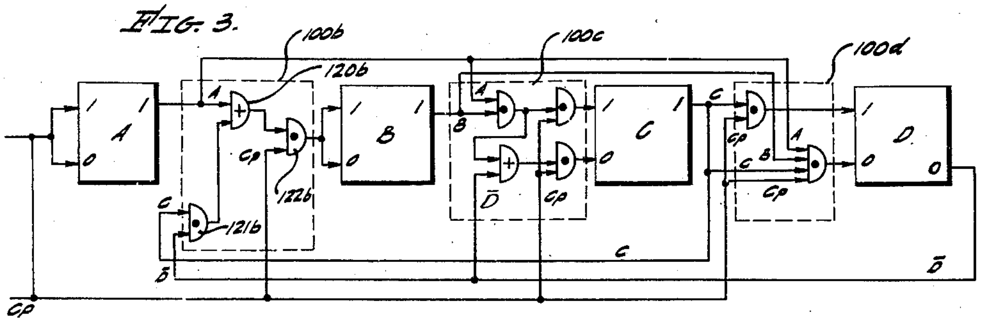
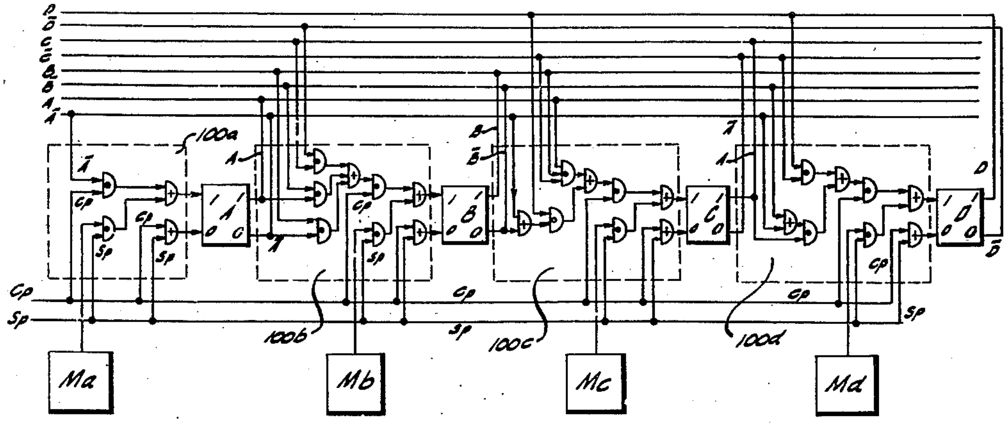
FIG. 4.
INVENTOR.
ELDRED C. NELSON,
BY
Seymour M. Rosenberg
ATTORNEY.

2,816,223

BINARY-CODED, FLIP-FLOP COUNTERS

Eldred C. Nelson, Los Angeles, Calif., assignor, by mesne assignments, to Hughes Aircraft Company, a corporation of Delaware Application December 23, 1952, Serial No. 327,567

8 Claims. (Cl. 250—27)

This invention relates to binary-coded, flip-flop counters, and more particularly to binary-coded, flip-flop counters wherein the sequence of stable states of each flip-flop, during a counting cycle, is controlled by a voltage-state signal produced by a novel transformation matrix.

The present invention extends the principles of the binary flip-flop counter described in copending U. S. patent application, Serial No. 245,860, entitled "High-Speed Flip-Flop Counter" by Eldred C. Nelson, filed September 10, 1951, to other binary-coded counters, with the introduction of a novel transformation theory which is described in detail below.

In the binary flip-flop counter described in the above-mentioned copending application, count pulses are applied simultaneously to each of the flip-flops through a single, associated gating circuit whenever all of the voltage-level control signals applied to the gating circuit are high-level signals representing binary 1. Since each of the gating circuits is responsive to a voltage state signal derived from the states of conduction of each of the preceding flip-flops in the counter, the counting operation proceeds in conventional binary sequence.

The binary flip-flop counter described in the copending application may be distinguished from prior art binary counters in that the flip-flops are not connected in "cascade." The term "cascade" is utilized to indicate that each flip-flop in the counter is connected to the preceding flip-flop in such a manner that it is triggered whenever the preceding flip-flop is triggered from a 1-representing state to a 0-representing state. When flip-flops are connected in cascade, the count pulses are applied only to the first flip-flop in the counter chain and triggering pulses must be propagated through the chain before the counter assumes a stable state representing the count. This means that the prior art binary counters must be allowed a "settling time" between count pulses which is at least N times the time required to propagate a pulse between two flip-flops; N being the total number of flip-flops. On the other hand, the "settling time" for binary counters designed according to the copending application is only the time required to pass a pulse signal through a gating circuit to the associated flip-flop.

The general transformation concept, as applied to binary-coded counters, is not new with the present invention. A few transformation functions, for example, are illustrated on pages 287 through 305 of Proceedings of the Association for Computing Machinery published on May 23, 1952, by Richard Rimbach Associates, Pittsburgh 12, Pa. The present invention, however, defines the utilization of three novel types of transformations and utilizes a fourth type of transformation, known in the prior art, in a novel manner; with the result that it is possible to design a simple, efficient counter for any binary code.

In binary-coded counters according to the present invention, pulses to be counted are applied to a transformation matrix, mechanized according to a set of transformation functions, one for each of the flip-flops in the counter.

The transformation matrix responds to voltage-state signals produced by the flip-flops and the applied counting pulses and produces control signals which control the sequence of stable states of the flip-flops. Each control signal is defined by one of the transformation functions such that when the conditions of the corresponding transformation function are satisfied, a count pulse is gated to the associated flip-flop input circuit.

In a ten-stable-state, binary counter according to the present invention, four flip-flops are utilized and the transformation matrix includes four submatrices, one for each flip-flop. Each of the submatrices is mechanized according to a set of transformation functions defining the sequence of stable states of the associated flip-flop, such that two of the flip-flops have conventional binary counting sequences and the remaining two flip-flops have conventional binary counting sequences until the ninth count and then are caused to return to the starting stable state.

It will be shown that any counting cycle and any sequence of binary codes may be defined by transformation functions according to the present invention, and that certain transformation functions make it possible to minimize gating circuitry. Thus, the principles of the present invention, in combination with those described in the copending application, define a class of binary-coded counters which: may be operated at high speed (since the flip-flops are not connected in cascade); may require a minimum of gating circuits, as defined by the transformation functions; and may have any desired counting cycle, or count in any desired binary code.

Accordingly, it is an object of the present invention to provide a binary-coded, flip-flop counter defined according to a novel set of transformation functions.

Another object of the invention is to provide a high-speed counter in which pulses to be counted are applied to each of the flip-flops through a single gating matrix; the counter cycling according to a predetermined binary code.

A further object of the invention is to provide a binary-coded, flip-flop counter utilizing a minimum of gating circuits, as defined by a set of transformation functions.

Still another object is to provide a binary-coded, flip-flop counter wherein a transformation matrix is utilized to produce control signals determining the counting sequence of the counter, the transformation matrix being responsive to voltage-state signals produced by the flip-flops and to the applied counting pulses.

The novel features which are believed to be characteristic of the invention, both as to its organization and the method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention Fig. 1 is a block diagram of the basic embodiment of the present invention.

Fig. 2 is a schematic diagram of a ten-stable-state, binary-coded counter according to the present invention.

Fig. 3 is a schematic diagram of another ten-stable-state counter, having a different counting code than that of the counter shown in Fig. 2; and Fig. 4 is a schematic diagram of another form of the ten-stable-state counter shown in Fig. 3.

Referring now to Figure 1, there is shown one embodiment of a binary-coded counter according to the present invention in which pulses $Cp$ to be counted are applied to a transformation matrix 100 which produces control signals for actuating a plurality of flip-flop stages A, B, . . . and N, where N is utilized to indicate that any number of stages may be included. Flip-flops A, B, . . . and N produce complementary signals: A, $\overline{A}$; B, $\overline{B}$; . . . and N, $\overline{N}$, respectively; signals A, B, . . . and N having levels representing binary 1 and 0 when the corresponding flip-flops register binary 1 and 0, respectively; and signals $\overline{A}$, $\overline{B}$, . . . and $\overline{N}$ have levels representing binary 1 and 0 when the corresponding flip-flops register binary 0 and 1, respectively.

Transformation matrix 100 includes N submatrices, one for each of the N flip-flops; each of the submatrices responding to certain ones of signals A, $\overline{A}$; B, $\overline{B}$, . . . N, $\overline{N}$ and to signals C*p*, according to a predetermined transformation function. Each transformation function determines the sequence of stable states of the associated flip-flop, as counting pulses C*p* are applied. Since the sequence of individual flip-flops considered as a whole determines the counting cycle and the particular counting code, it is apparent that the transformation functions may be considered as completely defining the counter cycle and code.

Three general types of transformation functions are considered in the description which follows. The first type of transformation function defines the conditions for setting a flip-flop to a stable state representing binary 1, and is herein referred to as a "setting transformation." The second type of transformation defines the conditions for changing a flip-flop to its opposite representing state, i. e., from a 0-or-1 representing state to a 1-or-0 representing state, and is referred to herein as a "changing transformation." Finally, the third type of transformation provides separate conditions for changing the stable state of a flip-flop from a 1-representing state to a 0-representing state, and for changing the flip-flop from a 0-representing state to a 1-representing state; this type of transformation is considered as including two transformations referred to as "partial changing transformations."

The changing transformation functions which are considered below are represented by the symbol "C" followed by the letter *a, b,* . . . or *n*, indicating the particular flip-flop which is controlled. Thus, the changing transformation function utilized to control flip-flop A is represented as C*a*. The partial changing transformations are represented in the same manner as the corresponding changing transformation with the addition of a number 1 or 0 indicating whether the flip-flop is changed to 1 or changed to 0. Thus, the partial changing transformation C*b*0 indicates the conditions for changing flip-flop B from a stable-state representing binary 1 to a stable-state representing binary 0. The setting transformations are designated by the symbol "S" plus the letter *a, b,* . . . or *n*, and either a 1 or 0, depending upon whether the flip-flop is to be set to 1 or 0.

In the discussion which follows, the three basic types of transformations are considered in detail and then a simplification technique is introduced, making it possible to simplify certain of the partial changing transformations, where a conventional flip-flop of the type described below is utilized. The notation which is utilized to represent the simplified transformations is introduced below.

While the principles of the present invention are applicable to a great number of counters, having different cycles and counting in different codes, for simplicity, only two counting cycles and two codes are considered in detail in the discussion which follows. A schematic diagram of the first counter considered is shown in Fig. 2 and has been selected to illustrate the mechanization of submatrices according to changing and simplified partial changing transformations. Two circuits are shown for the second counter, one utilizing changing and simplified partial changing functions, and the other using only setting functions; these are shown in Figs. 3 and 4, respectively.

Consider now the transformation functions defining the counting cycle and code of the first counter; the counting stable states of which are shown below in Table I. It will be noted that columns A, B, C, and D in Table I represent, respectively, the sequence of stable states of flip-flops A, B, C, and D, shown in Fig. 2, during a counting cycle. The counter stable states are represented as: (0), (1), . . . and (9), respectively. It may be seen that the counts are in the conventional binary code if flip-flop A is considered as representing the least significant binary digit and B, C, and D successively higher-place binary digits.

TABLE I

| | A | B | C | D |
|---|---|---|---|---|
| (0) | 0 | 0 | 0 | 0 |
| (1) | 1 | 0 | 0 | 0 |
| (2) | 0 | 1 | 0 | 0 |
| (3) | 1 | 1 | 0 | 0 |
| (4) | 0 | 0 | 1 | 0 |
| (5) | 1 | 0 | 1 | 0 |
| (6) | 0 | 1 | 1 | 0 |
| (7) | 1 | 1 | 1 | 0 |
| (8) | 0 | 0 | 0 | 1 |
| (9) | 1 | 0 | 0 | 1 |
| (0) | 0 | 0 | 0 | 0 |

Referring now to Table I, consider the transformation functions for flip-flop A. Flip-flop A is changed from a 0 state to a 1 state whenever it is in a 0 state and a pulse C*p* is applied. Thus, the 0-to-1 partial changing transformation for flip-flop A is:

$$Ca1=\overline{A}.Cp$$

where the dot (.) signifies the logical "and." This function implies that whenever A is 0, as signalled by $\overline{A}=1$, and a pulse C*p* is applied to the counter, a pulse is applied to the 1 input circuit of flip-flop A. Similarly, it is apparent that the 1-to-0 partial changing transformation function for flip-flop A is:

$$Ca0=A.Cp$$

since flip-flop A is changed to 0 whenever A is 1; and that the changing transformation for flip-flop A may be expressed as the logical sum of C*a*1 and C*a*0, expressed as:

$$Ca=Ca1+Ca0=(\overline{A}+A).Cp=Cp$$

where the plus (+) signifies the logical "or." The changing function for A, then indicates that flip-flop A is triggered each time a counting pulse is applied.

Since A is set to 1 by a pulse C*p*, each time it is 0, and is set to 0 by C*p* each time it is 1, it is apparent that the setting transformations for A are:

$$Sa1=\overline{A}.Cp$$

$$Sa0=A.Cp$$

Fip-flop B is changed from 0 to 1 after counts of (1) and (5). The counts of (1) and (5) may be represented algebraically as: $A.\overline{B}.\overline{C}.\overline{D}$ and $A.\overline{B}.C.\overline{D}$, respectively. Thus, the partial changing transformation C*b*1 is:

$$Cb1=(1)+(5)=(A.\overline{B}.\overline{C}.\overline{D}+A.\overline{B}.C.\overline{D}).Cp$$
$$=A.\overline{B}.\overline{D}.(\overline{C}+C).Cp=A.\overline{B}.\overline{D}.Cp$$

Reference again to Table I shows that B is changed from 1 to 0 after counts of (3) and (7), providing the transformation:

$$CB0=(3)+(7)=A.B.\overline{C}.\overline{D}+A.B.C.\overline{D}).Cp$$
$$=A.B.\overline{D}.(\overline{C}+C).Cp=A.B.\overline{D}.Cp$$

C*b*, the logical sum of C*b*1 and C*b*0 then is:

$$Cb=(A.\overline{B}.\overline{D}+A.B.\overline{D}).Cp=A.\overline{D}.(\overline{B}+B).Cp=A.\overline{D}.Cp$$

Flip-flop B is set to 1 after counts of (1), (2), (5), and (6) and is set to 0 after counts of (0), (3), (4), (7), (8), and (9). It is not necessary to derive both of the functions $Sb1$ and $Sb0$, since $Sb0$ is equal to $\overline{Sb1}$. In other words, if B is not set to 1, it is always set to 0. The setting transformations for B then are:

$$Sb1=(1)+(2)+(5)+(6).Cp$$
$$=(A.\bar{B}.\bar{C}.\bar{D}+\bar{A}.B.\bar{C}.\bar{D}+A.\bar{B}.C.\bar{D}+\bar{A}.B.C.\bar{D}).Cp$$
$$=\bar{D}.(A.\bar{B}+\bar{A}.B).(\bar{C}+C).Cp=\bar{D}.(A.\bar{B}+\bar{A}.B).Cp$$
$$Sb0=\overline{Sb1}=[D+(\bar{A}+B).(A+\bar{B})].Cp$$
$$=(D+\bar{A}.\bar{B}+A.B).Cp$$

The function $Sb0$ may, of course, also be obtained from the logical sum: (0)+(3)+(4)+(7)+(8)+(9).

Observation of Table I shows that flip-flop C is changed to 1 only after a mount of (3), and that it is changed to 0 only after a count of (7). Thus, the C partial changing transformations are:

$$Ccl=(3)=A.B.\bar{C}.\bar{D}.Cp$$
$$Cc0=(7)=A.B.C.\bar{D}.Cp$$

It will be noted that no other counts except (3) and (7) are identified by the condition: A.B. This means that counts of (3) and (7) may be distinguished by the conditions: $(3)=A.B.\bar{C}$, and $(7)=A.B.C$. Another way of establishing these conditions is to recognize that the conditions: $A.B.\bar{C}.D$ *and* $A.B.C.D$ never occur in the counting cycle shown in Table I, since these conditions would represent counts of (11) and (15), respectively. These conditions, then, may be considered as identically equal to 0. The conditions for counts of (3) and (7) are then reduced by adding the 0 conditions as follows:

$$(3)=A.B.\bar{C}.\bar{D}+A.B.\bar{C}.D=A.B.\bar{C}.(\bar{D}+D)=A.B.\bar{C}$$
$$(4)=A.B.C.\bar{D}+A.B.C.D=A.B.C.(\bar{D}+D)=A.B.C$$

The reduced conditions for (3) and (7) then provide the partial changing transformations:

$$Cc1=A.B.\bar{C}.Cp$$
$$Cc0=A.B.C.Cp$$

and the changing transformation for C is:

$$Cc=A.B.(\bar{C}+C).Cp=A.B.Cp$$

Before proceeding to consider functions $Sc1$ and $Sc0$ and the D transformations, it is convenient to reduce the count-distinguishing conditions to their simplest algebraic form. The algebraic functions are reduced directly from Table I, although the reduction may be accomplished by adding 0 functions in the manner explained above. The reduced count-distinguishing conditions are:

$(0)=\bar{A}.\bar{B}.\bar{C}.\bar{D}$ $(1)=A.\bar{B}.\bar{C}.\bar{D}$ $(2)=\bar{A}.B.\bar{C}$ $(3)=A.B.\bar{C}$ $(4)=A.\bar{B}.\bar{C}$ $(5)=A.\bar{B}.C$ $(6)=\bar{A}.B.C$ $(7)=A.B.C$ $(8)=\bar{A}.D$ $(9)=A.D$ Flip-flop C is set to 1 after counts: (3), (4), (5), and (6); indicating that functions $Sc1$ and $Sc0$ are:

$$Sc1=[(3)+(4)+(5)+(6)].Cp$$
$$=[A.B.\bar{C}+A.\bar{B}.\bar{C}+A.\bar{B}.C+\bar{A}.B.C].Cp$$
$$=[A.B.\bar{C}+C.(\bar{A}.\bar{B}+A.\bar{B}+\bar{A}.B)].Cp$$
$$=[A.B.\bar{C}+C.(\bar{A}.+\bar{B})].Cp$$
$$Sc0=\overline{Sc1}=[(\bar{A}+\bar{B}+C).(\bar{C}+A.B)].Cp$$
$$=[A.B.C+\bar{C}.(\bar{A}+\bar{B})].Cp$$

The D transformation functions may now be derived directly from Table II below where each of the functions: C$d$1; C$d$0; C$d$; S$d$1; and S$d$; is represented as a column of binary variables (1 or 0), one for each of the counts (0) through (9).

TABLE II

| | | C$d$1 | C$d$0 | C$d$ | S$d$1 | S$d$0 |
|---|---|---|---|---|---|---|
| (0) | $\bar{A}.\bar{B}.\bar{C}.\bar{D}$ | 0 | 0 | 0 | 0 | 1 |
| (1) | $A.\bar{B}.\bar{C}.\bar{D}$ | 0 | 0 | 0 | 0 | 1 |
| (2) | $\bar{A}.B.\bar{C}$ | 0 | 0 | 0 | 0 | 1 |
| (3) | $A.B.\bar{C}$ | 0 | 0 | 0 | 0 | 1 |
| (4) | $\bar{A}.\bar{B}.C$ | 0 | 0 | 0 | 0 | 1 |
| (5) | $\bar{A}.\bar{B}.C$ | 0 | 0 | 0 | 0 | 1 |
| (6) | $A.B.C$ | 0 | 0 | 0 | 0 | 1 |
| (7) | $A.B.C$ | 1 | 0 | 1 | 1 | 0 |
| (8) | $\bar{A}.D$ | 0 | 0 | 0 | 1 | 0 |
| (9) | $A.D$ | 0 | 1 | 1 | 0 | 1 |

The partial changing transformations C$d$1 and C$d$0 are 1 for counts of (7) and (9), respectively, providing the functions:

$$Cd1=(7).Cp=A.B.C.Cp$$
$$Cd0=(9).Cp=A.D.Cp$$
$$Cd=Cd1+Cd0=[A.B.C+A.D].Cp$$

The setting function $Sd1$ is 1 for counts of (7) and (8), providing the functions:

$$Sd1=[(7)+(8)].Cp=[A.B.C+\bar{A}.D].Cp$$
$$Sd0=\overline{Sd1}=[(\bar{A}+\bar{B}+\bar{C}).(A+\bar{D})].Cp$$

A fourth type of transformation function may be derived from the partial changing transformation functions considered above, when a conventional flip-flop is used and the transformation function for the flip-flop includes one of the flip-flop output signals. A conventional flip-flop, as herein defined, is one having 1 and 0 input circuits and connected so that pulses applied separately to the 1 and 0 input circuits set the flip-flop to stable states representing binary 1 and 0, respectively; while the simultaneous application of pulses to both input circuits of the flip-flop causes it to "trigger" or change from one stable state to another.

Where the 0-to-1 partial changing transformation function controlling a flip-flop includes the complementary output signal of the flip-flop, the function may be simplified by replacing the signal or variable with binary 1. This simplification implies that, regardless of the setting of the flip-flop, a pulse is applied to its 1 input circuit whenever the other conditions of the partial changing function are satisfied. Thus, the partial changing transformation $Cb1=A.\overline{B.D}.Cp$ may be simplified by substituting 1 for $\bar{B}$, providing the simplified function: $1B=A.\bar{D}.Cp$, where the notations 1A, 0A, 1B, 0B, . . . 1N, and 0N are utilized to represent the simplified transformations C$a$1, C$a$0, C$b$1, C$b$0 . . . C$n$1, and C$n$0, respectively.

The function 1B differs from the function C$b$1, then, in that a count pulse is applied to the 1 input circuit of flip-flop B for both of the conditions: $A.B.\bar{D}=1$ and $A.\bar{B}.\bar{D}=1$. It is apparent, however, that for the condition $A.B.\bar{D}$ to be equal to 1, the flip-flop B must already be set to 1, indicating that there is no change due to the application of a count pulse to the 1 input circuit of the flip-flop, unless a pulse is simultaneously applied to the flip-flop 0 input circuit.

In a similar manner the 1-to-0 partial transformation function controlling a flip-flop may be simplified by replacing the flip-flop output signal with binary 1. Thus, the function $Cb0=A.B.\bar{D}.Cp$ may be simplified to $0B=A.\bar{D}.Cp$; and a complete set of simplified functions for the counter considered above are:

$1A=Cp$ $0A=Cp$ $1B=A.\bar{D}.Cp$ $0B=A.\bar{D}.Cp$ $1C=A.B.Cp$ $0C=A.B.Cp$ $1D=A.B.C.Cp$ $0D=A.Cp$ Where the 1 and 0 simplified functions for a flip-flop are the same, they are equal to the corresponding changing function. Thus, it is apparent that the simplified functions for flip-flops A, B, and C provide the desired transformations, since they correspond to the changing transformations discussed above. That the simplified functions for flip-flop D provide the proper transformation may be observed from Table III, below, where the functions $Cd1$, 1D, $Cd0$, and 0D are listed for each of the count conditions.

TABLE III

| | | A | B | C | D | $Cd1$ | 1D | $Cd0$ | 0D |
|---|---|---|---|---|---|---|---|---|---|
| (0) | $\bar{A}.\bar{B}.\bar{C}.\bar{D}$ | 0 | 0 | 0 | 0 | 0 | 0 | 0 | 0 |
| (1) | $A.\bar{B}.\bar{C}.\bar{D}$ | 1 | 0 | 0 | 0 | 0 | 0 | 0 | 1 |
| (2) | $\bar{A}.B.\bar{C}$ | 0 | 1 | 0 | 0 | 0 | 0 | 0 | 0 |
| (3) | $A.B.\bar{C}$ | 1 | 1 | 0 | 0 | 0 | 0 | 0 | 1 |
| (4) | $\bar{A}.\bar{B}.C$ | 0 | 0 | 1 | 0 | 0 | 0 | 0 | 0 |
| (5) | $A.\bar{B}.C$ | 1 | 0 | 1 | 0 | 0 | 0 | 0 | 1 |
| (6) | $\bar{A}.B.C$ | 0 | 1 | 1 | 0 | 0 | 0 | 0 | 0 |
| (7) | $A.B.C$ | 1 | 1 | 1 | 0 | 1 | 1 | 0 | 1 |
| (8) | $\bar{A}.D$ | 0 | 0 | 0 | 1 | 0 | 0 | 0 | 0 |
| (9) | $A.D$ | 1 | 0 | 0 | 1 | 0 | 0 | 1 | 1 |

When the simplified functions 1D and 0D are utilized, a pulse is applied to the 0 input circuit of flip-flop D after each count for which A is 1. This pulse has no effect after counts of (1), (3), and (5), since D is already 0 and no pulse is applied to the 1 input circuit of the flip-flop. On the seventh count, however, functions 1D and 0D are both 1 and consequently, the flip-flop is triggered from its 0 state to its 1 state. It can be seen, then, that the application of a pulse to the 0 input circuit of a flip-flop which is already set to 0 does not alter the effect of the 1-setting pulse since the simultaneous application of 1 and 0 input pulses has the same effect as the application of a single pulse to the 1 input circuit, namely that the stable state of the flip-flop is changed from 0 to 1. In a similar manner it should be apparent that the application of a pulse to the input circuit of a flip-flop when it is in its 1 state does not alter the effect of a 0-setting pulse since the flip-flop is triggered from the 1 state to the 0 state upon the simultaneous application of the pulses.

In addition to defining the simplified partial-changing functions in terms of a simplification of corresponding partial-changing functions, these functions may also be given an independent definition which is useful. It will be noted that after appropriate substitutions have been made to eliminate the signals of the flip-flop which is controlled, the resulting simplified functions permit the application of count pulses, under certain conditions, where the flip-flop is already in the desired state or where the desired change is effected regardless of the application of such a signal. Thus, each simplified partial-changing function defines a control signal having one level when count pulses must be or may be applied and having a second level when count pulses should not be applied, the selection of permissible pulse-applying-conditions being made in a manner providing the simplest transformation function.

As has been explained, transformation matrix 100 includes a submatrix for each of the flip-flops in the counter. It is convenient, then, to number the transformation functions according to the submatrix they define. Thus, the transformation functions defining submatrices **100*b*, 100*c*, and 100*d*** of the counter shown in Fig. 2 are given the equation numbers 100*b*, 100*c*, and 100*d*, respectively. The mechanization functions for the counter of Fig. 2, then, are:

$$(100a)\quad Ca=Cp$$

$$(100b)\quad Cb=A.\bar{D}.Cp$$

$$(100c)\quad Cc=A.B.Cp$$

$$(100d)\quad \begin{cases} 1D=A.B.C.Cp \\ 0D=A.Cp \end{cases}$$

where changing transformations are utilized whenever the simplified functions for the same flip-flop are equal.

Each "and" function in the above transformations is provided by an "and" circuit which is responsive to signals representing the variables of the "and" function to produce an output signal representing binary 1, when all of the applied signals represent binary 1. Thus, "and" circuit **110*b*, in submatrix 100*b*** of Fig. 2, is mechanized according to the "and" function of Equation 100*b* and responds to signals A, $\bar{D}$, and $Cp$ applied to separate input terminals for producing a pulse signal representing binary 1 when $A=\bar{D}=Cp=1$. The condition $Cp=1$, it will be noted, is an algebraic representation of the fact that a count pulse is applied.

"And" circuits for providing the above-described operation are well known in the computer art; suitable circuits, for example, being shown on pages 37 to 45 of High-Speed Computing Devices by Engineering Research Associates, published in 1950 by McGraw-Hill Company, Inc., New York and London, and in an article entitled "Diode coincidence and mixing circuits in digital computers" by Tung Chang Chen in vol. 38 of the Proceedings of the Institute of Radio Engineers, May 1950, on pages 511 through 514.

Consider now Table IV, showing the code, counting cycle, simplified count conditions, and the binary values of the transformations for the second counter, exemplary embodiments of which are shown in Figs. 3 and 4.

TABLE IV

| | | A | B | C | D | $Cb1$ | $Cb0$ | $Cb$ | $Sb1$ | $Cc1$ | $Cc0$ | $Cc$ | $Sc1$ | $Cd1$ | $Cd0$ | $Cd$ | $Sd1$ |
|---|---|---|---|---|---|---|---|---|---|---|---|---|---|---|---|---|---|
| (0) | $\bar{A}.\bar{B}.\bar{C}$ | 0 | 0 | 0 | 0 | 0 | 0 | 0 | 0 | 0 | 0 | 0 | 0 | 0 | 0 | 0 | 0 |
| (1) | $A.\bar{B}.\bar{C}$ | 1 | 0 | 0 | 0 | 1 | 0 | 1 | 1 | 0 | 0 | 0 | 0 | 0 | 0 | 0 | 0 |
| (2) | $\bar{A}.B.\bar{C}$ | 0 | 1 | 0 | 0 | 0 | 0 | 0 | 1 | 0 | 0 | 0 | 0 | 0 | 0 | 0 | 0 |
| (3) | $A.B.\bar{D}$ | 1 | 1 | 0 | 0 | 0 | 1 | 1 | 0 | 1 | 0 | 1 | 1 | 0 | 0 | 0 | 0 |
| (4) | $C.\bar{D}$ | 0 | 0 | 1 | 0 | 1 | 0 | 1 | 1 | 0 | 1 | 1 | 0 | 1 | 0 | 1 | 1 |
| (5) | $\bar{C}.D$ | 1 | 1 | 0 | 1 | 0 | 1 | 1 | 0 | 1 | 0 | 1 | 1 | 0 | 0 | 0 | 1 |
| (6) | $\bar{A}.\bar{B}.D$ | 0 | 0 | 1 | 1 | 0 | 0 | 0 | 0 | 0 | 0 | 0 | 1 | 0 | 0 | 0 | 1 |
| (7) | $A.\bar{B}.C$ | 1 | 0 | 1 | 1 | 1 | 0 | 1 | 1 | 0 | 0 | 0 | 1 | 0 | 0 | 0 | 1 |
| (8) | $\bar{A}.B.C$ | 0 | 1 | 1 | 1 | 0 | 0 | 0 | 1 | 0 | 0 | 0 | 1 | 0 | 0 | 0 | 1 |
| (9) | $A.B.C$ | 1 | 1 | 1 | 1 | 0 | 1 | 1 | 0 | 0 | 1 | 1 | 0 | 0 | 1 | 1 | 0 |

Since flip-flop A is set to 1 after each count during which it is 0 and is set to 0 after each count during which it is 1, it is apparent that the A transformations are:

$$Ca1=\bar{A}.Cp,\ 1A=Cp$$

$$Ca0=A.Cp,\ 0A=Cp$$

$$Ca=Cp,\ Sa1=\bar{A}.Cp,\ \text{and}\ Sa0=A.Cp$$

The B, C, and D transformations derived from Table IV then are:

*B transformations*

$$Cb1=[(1)+(4)+(7)].Cp$$

$$=(A.\bar{B}.\bar{C}+C.\bar{D}+A.\bar{B}.C).Cp=(A.\bar{B}+C.\bar{D}).Cp$$

$$1B=(A+C.\overline{D}).Cp$$
$$Cb0=[(3)+(5)+(9)].Cp$$
$$=[A.B.\overline{D}+\overline{C}.D+A.B.C].Cp$$
$$=[A.B.(\overline{D}+C)+\overline{C}.D].Cp$$
$$=(A.B+\overline{C}.D).Cp=A.B.Cp$$

NOTE.—The term $\overline{C}.D$ is redundant since $A.B$ is 1 for all of the necessary counts; (3), (5), and (9); and for no other counts in the code. This same result for $Cb0$ may be obtained by combining the simplified condition for count (9) with counts (3) and (5) in their expanded or unsimplified form as follows:

$$Cb0=[(3)+(5)+(9)].Cp$$
$$=[A.B.\overline{C}.\overline{D}+A.B.\overline{C}.D+A.B.C].Cp$$
$$=A.B.(\overline{C}+C).Cp$$
$$=A.B.Cp$$
$$0B=A.Cp$$
$$Cb=[(A.\overline{B}+C.\overline{D})+A.B].Cp$$
$$=(A+C.\overline{D}).Cp$$
$$Sb1=[(1)+(2)+(4)+(7)+(8)].Cp$$
$$=[A.\overline{B}.\overline{C}+\overline{A}.B.\overline{C}+C.\overline{D}+A.\overline{B}.C+\overline{A}.B.C].Cp$$
$$=(A.\overline{B}+\overline{A}.B+C.\overline{D}).Cp$$
$$Sb0=[(\overline{A}+B).(A+\overline{B}).(\overline{C}+D)].Cp$$

*C transformations*

$$Cc1=[(3)+(5)].Cp$$
$$=[A.B.\overline{D}+\overline{C}.D].Cp$$
$$=A.B.\overline{C}.Cp$$

(NOTE.—$A.B.\overline{C}=1$ satisfies both counts (3) and (5) and no others and therefore may be used to replace $A.B.\overline{D}+\overline{C}.D$. Again, this result may be obtained by combining counts (3) and (5) in expanded form.)

$$1C=A.B.Cp$$
$$Cc0=[(4)+(9)].Cp$$
$$=(C.\overline{D}+A.B.C).Cp$$
$$0C=(\overline{D}+A.B).Cp$$
$$Cc=(A.B.\overline{C}.+C.\overline{D}+A.B.C).Cp$$
$$=(A.B+C.\overline{D}).Cp$$
$$Sc1=[(3)+(5)+(6)+(7)+(8)].Cp$$
$$=[A.B.\overline{C}+(\overline{A}+B).D].Cp$$

(NOTE.—The term $A.B.\overline{C}$ is 1 for counts (3) and (5) and the term $(\overline{A}+\overline{B}).D$ for counts (6), (7), and (8).

$$Sc0=(\overline{A}+\overline{B}+C).(A.B+\overline{D}).Cp$$
$$=[A.B.C+(\overline{A}+\overline{B}+C).\overline{D}].Cp$$

*D transformations*

$$Cd1=(4).Cp=C.D.Cp$$
$$1D=C.Cp$$
$$Cd0=(9).Cp=A.B.C.Cp$$
$$0D=A.B.C.Cp$$
$$Cd=(C.\overline{D}+A.B.C).Cp$$
$$Sd1=[(4)+(5)+(6)+(7)+(8)].Cp$$
$$=\{(5)+[(4)+(6)+(7)+(8)]\}.Cp$$
$$=[\overline{C}.D+(\overline{A}+\overline{B}).C].Cp$$
$$Sd0=[(C+\overline{D}).(A.B+\overline{C})].Cp$$

A considerable number of counters may be mechanized from the above transformations by utilizing different combinations of functions and by mechanizing different algebraic forms of each function. Where circuit simplicity and power minimization is introduced as a factor, however, the choice may be limited considerably. The counter shown in Fig. 3 illustrates one of the simpler forms of mechanizations which are possible and is mechanized according to the transformation set:

(100a) $Ca=Cp$ (100b) $Cb=(A+C.\overline{D}).Cp$ (100c) $\begin{cases} 1C=(A.B).Cp \\ 0C=(\overline{D}+A.B).Cp \end{cases}$ where the term $A.B$ is used in both 1 and 0 input circuits (100d) $\begin{cases} 1D=C.Cp \\ 0D=A.B.C.Cp \end{cases}$ where it will be noted that the simplified functions are utilized whenever it is possible to eliminate a variable from the changing function.

The manner in which the "and" functions are mechanized in the above functions should be apparent from the examples already given with regard to the counter of Fig. 2. Each "or" (+) function is provided by an "or" circuit which may be of the type described in the publications referred to above. The "or" circuit produces an output signal representing binary 1 when either or both of the applied signals represents binary 1.

Thus, in the mechanization of equation 100b provided by submatrix 100b of Fig. 3, "or" circuit 120b responds to signals A and $C.\overline{D}$ applied to separate input terminals and produces a 1-representing signal whenever signal A or signal $C.\overline{D}$ (produced by "and" circuit 121b) is 1 or when both signals A and $C.\overline{D}$ are 1. In the complete mechanization of submatrix 100b, then, an "and" circuit 122b responds to signals $(A+C.\overline{D})$ and $Cp$, applied to separate input terminals and produces a signal $$(A+C.D).Cp$$

which is effective to trigger flip-flop B when all of the conditions are satisfied. The mechanization of the other functions should be apparent from the examples given.

A mechanization of the second counter according to setting functions is illustrated in Fig. 4. When conventional flip-flops are used in the counter shown in Fig. 4, it is preferable to employ a complementing circuit in order to provide separate input signals for the flip-flop 1 and 0 input circuits. When the setting function is 1, the complementing circuit applies a pulse to one of the input circuits, and when it is 0 the complementing circuit applies a pulse to the other input circuit. Where 1-setting functions are utilized the complementing circuit applies pulses to the 1 and 0 input circuits, respectively, when the corresponding 1-setting function is 1 and 0. A complementing circuit suitable to provide this operation is shown and described in copending U. S. patent application, Serial No. 308,045, entitled "Complementary Signal Generating Networks" by D. L. Curtis, filed September 5, 1952, and assigned to the same assignee as this application.

Setting functions may also be used to control "overriding" flip-flops, where an overriding flip-flop is a flip-flop which is set to 1 and 0, respectively, by separate pulses applied to its 1 and 0 input circuits, but which is not triggered by the simultaneous application of pulses to both input circuits since pulses applied to one input circuit "override" those applied to the other setting the flip-flop to 1 or 0. One type of overriding flip-flop is shown and described in copending U. S. patent application, Serial No. 245,737, entitled "Triggering Network for Flip-flop Circuits" by D. L. Curtis, filed September 8, 1951; and now matured into Patent 2,723,080 on November 8, 1955.

Where a 1-setting transformation is utilized to control an overriding flip-flop, signals produced by the associated submatrix are applied to the 1 input circuit of the flip-flop, the 1 input circuit being the "overriding" input circuit of the flip-flop. Count pulse signals then are continuously applied to the 0 input circuit of the flip-flop so that it is set to 0 unless an overriding pulse is applied through the controlling submatrix to the 1 input circuit— setting the flip-flop to 1. As a result, the flip-flop is always set to a state corresponding to the value of the setting function; since, the flip-flop is set to 1 and 0, respectively, when the setting function has values of 1 and 0.

Where the counter flip-flops have no function outside of the counter, changing or simplified transformation functions are generally preferred since they are usually simpler. In some applications, however, the counter flip-flops may be utilized to store the output signal of a rather complicated matrix, when they are not functioning in a counting cycle. In this situation, the setting functions are preferred where the additional counter complexity is more than compensated for by the saving in circuits for the matrix function storage. A combined matrix-function storage unit and counter is shown in Fig. 4, the counter being mechanized according to the 1-setting transformation functions for the second counter. Matrices Ma, Mb, Mc, and Md produce signals to be stored in flip-flops A, B, C, and D, respectively.

The circuit shown in Fig. 4 is mechanized according to the functions:

(100a) $Sa1=\bar{A}.Cp+Ma.Sp$ (100b) $Sb1=(A.\bar{B}+\bar{A}.B+C.\bar{D}).Cp+Mb.Sp$ (100c) $Sc1=[A.B.\bar{C}+(\bar{A}+\bar{B}).D].Cp+Mc.Sp$ (100d) $Sd1=[\bar{C}.D.+(\bar{A}+\bar{B}).C]Cp+Md.Sp$ where $Sp$ is a matrix function entry pulse. It is assumed that flip-flops A, B, C, and D are overriding flip-flops and consequently, signal $Cp+Sp$ is applied to the 0 input circuit of each flip-flop.

Since the principles of the present invention are applicable to an enormous number of counters having any code sequence and cycle desired, it is obviously impossible to describe all of the species of the present invention, or even all of those of special interest. Therefore, it should be understood that the set of transformations shown below, relating to one counter of special interest, are not the only other set of interest.

Table V, and the transformation functions which follow, define a sixteen-stable-state counter having a reflected-binary code sequence. The manner in which the functions are derived and mechanized should be apparent from the examples already considered; therefore, further discussion is deemed unnecessary.

TABLE V

| | A | B | C | D | Ca1 | Ca0 | Ca | Sa1 | Cb1 | Cb0 | Cb | Sb1 |
|---|---|---|---|---|---|---|---|---|---|---|---|---|
| (0) | 0 | 0 | 0 | 0 | 0 | 0 | 0 | 0 | 0 | 0 | 0 | 0 |
| (1) | 0 | 0 | 0 | 1 | 0 | 0 | 0 | 0 | 0 | 0 | 0 | 0 |
| (2) | 0 | 0 | 1 | 1 | 0 | 0 | 0 | 0 | 0 | 0 | 0 | 0 |
| (3) | 0 | 0 | 1 | 0 | 0 | 0 | 0 | 0 | 1 | 0 | 1 | 1 |
| (4) | 0 | 1 | 1 | 0 | 0 | 0 | 0 | 0 | 0 | 0 | 0 | 1 |
| (5) | 0 | 1 | 1 | 1 | 0 | 0 | 0 | 0 | 0 | 0 | 0 | 1 |
| (6) | 0 | 1 | 0 | 1 | 0 | 0 | 0 | 0 | 0 | 0 | 0 | 1 |
| (7) | 0 | 1 | 0 | 0 | 1 | 0 | 1 | 1 | 0 | 0 | 0 | 1 |
| (8) | 1 | 1 | 0 | 0 | 0 | 0 | 0 | 1 | 0 | 0 | 0 | 1 |
| (9) | 1 | 1 | 0 | 1 | 0 | 0 | 0 | 1 | 0 | 0 | 0 | 1 |
| (10) | 1 | 1 | 1 | 1 | 0 | 0 | 0 | 1 | 0 | 0 | 0 | 1 |
| (11) | 1 | 1 | 1 | 0 | 0 | 0 | 0 | 1 | 0 | 1 | 1 | 0 |
| (12) | 1 | 0 | 1 | 0 | 0 | 0 | 0 | 1 | 0 | 0 | 0 | 0 |
| (13) | 1 | 0 | 1 | 1 | 0 | 0 | 0 | 1 | 0 | 0 | 0 | 0 |
| (14) | 1 | 0 | 0 | 1 | 0 | 0 | 0 | 1 | 0 | 0 | 0 | 0 |
| (15) | 1 | 0 | 0 | 0 | 0 | 1 | 1 | 0 | 0 | 0 | 0 | 0 |

| | A | B | C | D | Cc1 | Cc0 | Cc | Sc1 | Cd1 | Cd0 | Cd | Sd1 |
|---|---|---|---|---|---|---|---|---|---|---|---|---|
| (0) | 0 | 0 | 0 | 0 | 0 | 0 | 0 | 0 | 1 | 0 | 1 | 1 |
| (1) | 0 | 0 | 0 | 1 | 1 | 0 | 1 | 1 | 0 | 0 | 0 | 1 |
| (2) | 0 | 0 | 1 | 1 | 0 | 0 | 0 | 1 | 0 | 1 | 1 | 0 |
| (3) | 0 | 0 | 1 | 0 | 0 | 0 | 0 | 1 | 0 | 0 | 0 | 0 |
| (4) | 0 | 1 | 1 | 0 | 0 | 0 | 0 | 1 | 1 | 0 | 1 | 1 |
| (5) | 0 | 1 | 1 | 0 | 0 | 1 | 1 | 0 | 0 | 0 | 0 | 1 |
| (6) | 0 | 1 | 0 | 0 | 0 | 0 | 0 | 0 | 0 | 1 | 1 | 0 |
| (7) | 0 | 1 | 0 | 0 | 0 | 0 | 0 | 0 | 0 | 0 | 0 | 0 |
| (8) | 1 | 1 | 0 | 0 | 0 | 0 | 0 | 0 | 1 | 0 | 1 | 1 |
| (9) | 1 | 1 | 0 | 1 | 1 | 0 | 1 | 1 | 0 | 0 | 0 | 1 |
| (10) | 1 | 1 | 1 | 1 | 0 | 0 | 0 | 1 | 0 | 1 | 1 | 0 |
| (11) | 1 | 1 | 1 | 0 | 0 | 0 | 0 | 1 | 0 | 0 | 0 | 0 |
| (12) | 1 | 0 | 1 | 0 | 0 | 0 | 0 | 1 | 1 | 0 | 1 | 1 |
| (13) | 1 | 0 | 1 | 1 | 0 | 1 | 1 | 0 | 0 | 0 | 0 | 1 |
| (14) | 1 | 0 | 0 | 1 | 0 | 0 | 0 | 0 | 0 | 1 | 1 | 0 |
| (15) | 1 | 0 | 0 | 0 | 0 | 0 | 0 | 0 | 0 | 0 | 0 | 0 |

*A transformations*

$Ca1=(7).Cp=\bar{A}.B.\bar{C}.\bar{D}.Cp$ $1A=B.\bar{C}.\bar{D}.Cp$ $Ca0=(15).Cp=A.\bar{B}.\bar{C}.\bar{D}.Cp$ $0A=\bar{B}.\bar{C}.\bar{D}.Cp$ $Ca=(\bar{A}.B+A.\bar{B}).\bar{C}.\bar{D}.Cp$ $Sa1=[(7)+(8)+(9)+(10)+(11)+(12)+(13)+(14)].Cp$
$=[(A+\bar{A}).B.\bar{C}.\bar{D}+A.(B.D+C.\bar{D}+\bar{B}.D)].Cp$
$=[B.\bar{C}.\bar{D}+A.(D+C)].Cp$ $Sa0=[(\bar{B}+C+D).(\bar{A}+\bar{D}.\bar{C})].Cp$

*B transformations*

$Cb1=(3).Cp=\bar{A}.\bar{B}.C.\bar{D}.Cp$ $1B=\bar{A}.C.\bar{D}.Cp$ $Cb0=C.D.Cp=A.B.C.\bar{D}.Cp$ $0B=A.C.\bar{D}.Cp$ $Sb1=[(3)+(4)+(5)+(6)+(7)+(8)+(9)+(10)].Cp$
$=[\bar{A}.(C.\bar{D}+B.D)+B.(\bar{C}.\bar{D}+A.D.)].Cp$
$=[\bar{A}.C.\bar{D}+B.(\bar{C}+D)].Cp$ $Sb0=[(A+\bar{C}+D).(\bar{B}+C.\bar{D})].Cp$

*C transformations*

$Cc1=[(1)+(9)].Cp$
$=(C.\bar{A}.\bar{B}+A.B).\bar{C}.D.Cp$ $1C=(\bar{A}.\bar{B}+A.B).D.Cp$ $Cc0=[(5)+(3)].Cp$
$=(\bar{A}.B+A.\bar{B}).C.D.Cp$ $0C=(\bar{A}.B+A.\bar{B}).D.Cp$ $Cc=[(\bar{A}.\bar{B}+A.B).\bar{C}+(\bar{A}.B+A.\bar{B}).C].D.Cp$ $Sc1=\{[(1)+(2)+(9)+(10)]+[(3)+(4)+(11)+(12)]\}.Cp$
$=[(\bar{A}.\bar{B}+A.B).D+C.\bar{D}].Cp$ $Sc0=\{[(A+B).(\bar{A}+\bar{B})+\bar{D}].(\bar{C}+D)\}.Cp$
$=[(A.\bar{B}+\bar{A}.B+\bar{D}).(\bar{C}+D)].Cp$

*D transformations*

$Cd1=[(0)+(4)+(8)+(12)].Cp$
$=(\bar{A}.\bar{B}.\bar{C}+\bar{A}.B.C+A.B.\bar{C}+A.\bar{B}.C).\bar{D}.Cp$
$=[(\bar{A}.\bar{B}+A.B).\bar{C}+(\bar{A}.B+A.\bar{B}).C].\bar{D}.Cp$ $1D=[(\bar{A}.\bar{B}+A.B).\bar{C}+(\bar{A}.B+A.\bar{B}).C].Cp$ $Cd0=[(2)+(6)+(10)+(14)].Cp$
$=(\bar{A}.\bar{B}.C+\bar{A}.B.\bar{C}+A.B.C+A.\bar{B}.\bar{C}).D.Cp$
$=[(\bar{A}.\bar{B}+A.B).C+(\bar{A}.B+A.\bar{B}).\bar{C}].D.Cp$ $0D=[(\bar{A}.\bar{B}+A.B).C+(\bar{A}.B+A.\bar{B}).\bar{C}].Cp$ $Cd=Cd1+Cd0$ (no simplification possible)

$Sd1=[(0)+(2)+(4)+(6)+(8)+(9)+(12)+(13)].Cp$
$=(\bar{A}.\bar{B}.\bar{C}+\bar{A}.B.C+A.B.\bar{C}+A.\bar{B}.C).Cp$
$=[(\bar{A}.\bar{B}+A.B).\bar{C}+(\bar{A}.B+A.\bar{B}).C].Cp$ $Sd0=[(A+B).(\bar{A}+\bar{B})+C].[(A+\bar{B}).(\bar{A}+B)+\bar{C}].Cp$ It will be noted that many of the transformation forms above considered may be written in several factored forms. For example, function $Ca$, utilized in the 16-stable-state counter above considered, may be written:

$$Ca=(\bar{A}.B.\bar{C}.\bar{D}+A.\bar{B}.\bar{C}.\bar{D}).Cp$$

or, $$Ca=\bar{A}.B.\bar{C}.\bar{D}.Cp+A.\bar{B}.\bar{C}.\bar{D}.Cp$$

as well as $$Ca=(\bar{A}.B+A.\bar{B}).\bar{C}.\bar{D}.Cp$$

Each of these factored forms requires a different mechanization and consequently, it should be apparent that each embodiment described above is generic to a large group of mechanizations which are simply variations in form.

It is also possible to modify many of the above-considered transformations by making substitutions which are evident from observation of the corresponding table. Therefore, it is also necessary to consider each transformation function as generic to those which may be derived therefrom by substitution of equivalents which may be found algebraically or from the corresponding table. Finally, each function must be considered as generic to functions which may be obtained therefrom by such algebraic manipulations as: multiplication by a function which is equal to 1, such as $A+\overline{A}$; or addition of a function which is equal to 0, such as $A.\overline{A}$; or a count condition which does not occur in the counting cycle.

What is claimed is:

1. An electronic counter for counting the number of electrical signals applied thereto and indicating a count in the form of binary digit signals representative of a binary-coded decimal number, said counter comprising: a plurality of bistable storage devices each having a pair of input circuits and a single output circuit corresponding to a preselected state of the device, each of said devices being representative of a different valued binary digit, one of said bistable devices having an output circuit representative of a state opposite from the remaining devices, circuit means connected to each of said input circuits of said devices for applying thereto electrical signals to be counted, one of said devices other than said one device of a different output state having its input circuits directly connected to said circuit means, and transformation matrix circuit means interconnecting the remaining input circuits of said bistable devices with at least the output circuits representative of each of the next lowest binary digit for controlling the application of electrical signals to be counted and stored in said devices and thereby the state of same, the output circuit of said one bistable device of opposite state being connected to said transformation circuit means with the output of said one bistable device having its input circuits connected directly to said circuit means.

2. An electronic counter as defined in claim 1 wherein the transformation matrix circuit means for the input circuits of said bistable device having the output circuit of opposite state comprises separate matrix circuit means for each of the input circuits thereto and one of said circuit means being connected to all the output circuits of the devices representative of a lower valued binary digit.

3. An electronic counter for counting the number of electrical signals applied thereto and indicating a count in the form of binary digit signals representative of a binary coded decimal number, said counter comprising: a plurality of bistable storage devices each having a pair of input circuits and a single output circuit corresponding to a preselected state of the device, each of said devices being representative of a different valued binary digit, a first logical "and" gate interconnecting the output circuit of a first of said bistable devices with both the input circuits of a second of said bistable devices, a second logical "and" gate interconnecting the outputs of said first and second bistable devices with both the input circuits of a third of said bistable devices, a third logical "and" gate interconnecting the outputs of said first, second and third bistable devices with one of the input circuits of a fourth of said bistable devices, a fourth logical "and" gate interconnecting the output of said first bistable device with the other input circuit of said fourth bistable device, the output circuit for said fourth bistable device being representative of a state opposite from said remaining devices and connected to the input circuit for said first "and" gate, and circuit means connected to each of the input circuits for said first bistable device and each of said logical "and" gates for applying electrical signals to be stored in said devices.

4. An electronic counter for counting the number of electric signals applied thereto and indicating a count in the form of binary digit signals representative of a binary coded decimal number, said counter comprising: first, second, third and fourth bistable storage devices each having a plurality of input circuits and a single output circuit corresponding to a preselected state of the device, each of said devices being representative of a different valued binary digit, the output circuit of said fourth bistable device being representative of a state opposite from the remaining bistable devices, a first logical "and" gate connected to the output circuits for said third and fourth bistable devices, a first logical "or" gate connected to the output of said first bistable device and said first logical "and" gate, a second logical "and" gate having its input circuit connected to include the output of said first logical "or" gate and the output of same connected to the inputs for said second bistable device, a third logical "and" gate connected to the outputs of said first and second bistable devices, a second logical "or" gate connected to the output of said third logical "and" gate and the output of said fourth bistable device, a fourth logical "and" gate having its input circuit connected to include the output of said third logical "and" gate and its output to one of the input circuits for said third bistable device, a fifth logical "and" gate having its input circuit connected to include the output circuit of said second logical "or" gate and its output circuit connected to the remaining input circuit for said third bistable device, a sixth logical "and" gate having its input circuit connected to include the output of said third bistable device and its output connected to one of the input circuits for said fourth bistable device, a seventh logical "and" gate connected to the output of said first, second and third bistable devices and the output therefor to the input of said fourth bistable device, and circuit means connected to the input circuits for said first bistable device and to the input circuits to each of said second, fourth, fifth, sixth and seventh logical "and" gates.

5. An electronic counter for counting the number of applied pulses $Cp$ and indicating the count in the form of an N-binary digit, binary-coded number, said counter comprising: a plurality of flip-flop stages A, B, C and D producing complementary output signals A and $\overline{A}$ . . . D and $\overline{D}$, respectively, each of said flip-flop stages including a 1 and 0 input circuit; and transformation matrix means responsive to the applied pulses $Cp$ and coupled to the input circuits of said flip-flop stages for actuating said stages to produce signals corresponding to said number of applied pulses, said transformation matrices means including a plurality of sub-matrices coupled to the input circuits of flip-flop stages A, B, C and D, respectively, each of said sub-matrices being responsive to certain of said complementary output signals for producing at least one binary control signal and being defined in accordance with one of the following transformation functions:

$$Ca=Cp;\ Cb=A.\overline{D}.Cp;\ Cc=A.B.Cp;\ \begin{matrix}1D=A.B.C.Cp\\ 0D=A.Cp\end{matrix}$$

wherein the dot (.) signifies the logical "and" and $Ca$ . . . $Cd$ signifies the counters A . . . D, said transformation functions collectively defining the form of the binary-coded numbers and the number of stable states of said counter.

6. An electronic counter for counting the number of applied pulses $Cp$ and indicating the count in the form of an N-binary digit, binary-coded number, said counter comprising: a plurality of flip-flop stages A, B, C and D, producing complementary output signals A and $\overline{A}$, . . . D and $\overline{D}$, respectively, each of said flip-flop stages including a 1 and 0 input circuit; and transformation matrix means responsive to the applied pulses $Cp$ and coupled to the input circuits of said flip-flop stages for actuating said stages to produce signals corresponding to said number of applied pulses, said transformation matrices means including a plurality of sub-matrices coupled to the input circuits of flip-flop stages A, B, C and D, respectively, each of said sub-matrices being responsive to certain of said complementary output signals for producing at least one binary control signal and being defined in accordance with one of the following transformation functions:

$$Ca=Cp;\ Cb=(A+C.\overline{D}).Cp;\quad \left.\begin{matrix} 1C=(A.B).Cp \\ 0C=(D+A.B).Cp \end{matrix}\right\}Cc\quad \left.\begin{matrix} 1D=C.Cp \\ 0D=A.B.C.Cp \end{matrix}\right\}Cd$$

wherein the dot (.) signifies the logical "and" and the plus (+) signifies the logical "or," and $Ca$ . . . $Cd$ signifies the counters A . . . D, said transformation functions collectively defining the form of the binary-coded numbers and the number of stable states of said counter.

7. An electronic counter for counting the number of applied pulses $Cp$ and indicating the count in the form of an N-binary digit, binary-coded number, said counter comprising: a plurality of flip-flop stages A, B, C and D producing complementary output signals A and $\overline{A}$ . . . D and $\overline{D}$, respectively, each of said flip-flop stages including a 1 and 0 input circuit; and transformation matrix means responsive to the applied pulses $Cp$ and coupled to the input circuits of said flip-flop stages for actuating said stages to produce signals corresponding to said number of applied pulses, said transformation matrices means including a plurality of sub-matrices coupled to the input circuits of flip-flop stages A, B, C and D, respectively, each of said sub-matrices being responsive to certain of same complementary output signals for producing at least one binary control signal and defined in accordance with one of the following transformation functions:

$$Sa1=A.Cp;\ Sb1-(A.B+A.B+C.\overline{D}).Cp;$$
$$Sc1=[A.B.\overline{C}+(\overline{A}+\overline{B}).D].Cp;$$
$$Sd1=[\overline{C}.D+(A+B).C]Cp$$

wherein the dot (.) signifies the logical "and," and the plus (+) signifies the logical "or," and the brackets [] signify the "inclusive logical and" and $Sa$ . . . $Sd$ signifies counters A . . . D, said transformation functions collectively defining the form of the binary-coded numbers and the number of stable states of said counter.

8. An electronic counter as defined in claim 7 wherein the flip-flops are "overriding" flip-flops.

References Cited in the file of this patent

UNITED STATES PATENTS

| | | |
|---|---|---|
| 2,538,615 | Carbrey | Jan. 16, 1951 |
| 2,570,716 | Rochester | Oct. 9, 1951 |
| 2,644,887 | Wolfe | July 7, 1953 |
| 2,715,678 | Barney | Aug. 16, 1955 |

OTHER REFERENCES

"Electronic Engineering" (Br.), December 1950, article entitled "Physical Realization of an Electronic Digital Computor" by A. D. Booth, pp. 492–498.

"Journal of the British Institution of Radio Engineers," December 1952, "Optimum Relations Between Circuit Elements and Logical Symbols in the Design of Electronic Calculators," pp. 587–594.

"Third Interim Progress Report on the Physical Realization of an Electronic Computing Instrument," January 1948, pp. 128–133.